Jan. 23, 1945.　　　W. S. BRINK　　　2,367,823
DIVIDED RIM
Filed Aug. 15, 1941　　　2 Sheets-Sheet 1

INVENTOR
WINFIELD S. BRINK
BY
ATTORNEYS

Jan. 23, 1945.  W. S. BRINK  2,367,823
DIVIDED RIM
Filed Aug. 15, 1941   2 Sheets-Sheet 2
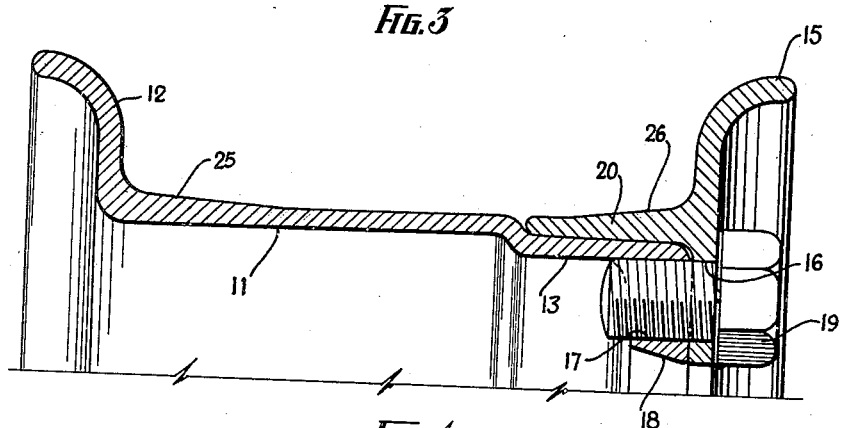
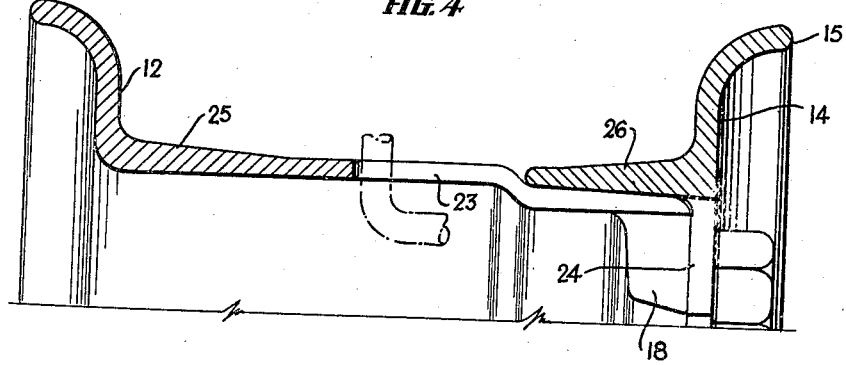
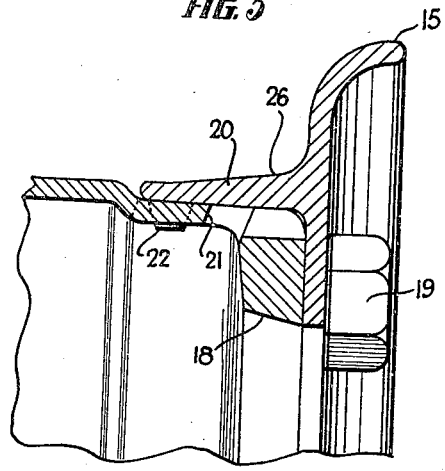
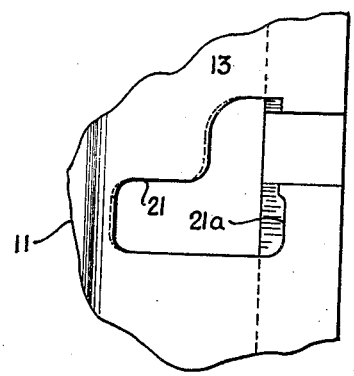
INVENTOR
WINFIELD S. BRINK
BY
Ely & Frye
ATTORNEYS Patented Jan. 23, 1945

2,367,823

UNITED STATES PATENT OFFICE 2,367,823

DIVIDED RIM

Winfield S. Brink, Akron, Ohio, assignor to The Firestone Tire & Rubber Company, Akron, Ohio, a corporation of Ohio Application August 15, 1941, Serial No. 407,205

2 Claims. (Cl. 152—411)

This invention relates to rim and wheel constructions, and more especially to circumferentially divided safety rims or wheels, the sections of which are not separable until load is removed therefrom.

Heretofore various types of safety rims or wheels, which are circumferentially divided, have been provided. These constructions have involved the use of bolts for securing the sections together and some type of safety means have been provided to prevent separation of the sections until they are positioned in a predetermined manner which is different from their relative positions when carrying a load, such as an inflated pneumatic tire. However, such constructions have not been easy to operate and/or they have not been 100% effective, or they have been open to other objections.

The general object of the present invention is to provide an improved, easily constructed divided safety rim or wheel which is easy to assemble.

Another object of the invention is to provide an inexpensive, sturdy, long lived divided safety wheel or rim.

A further object of the invention is to provide a divided type safety rim which is adapted to engage securely with the pneumatic tire thereon but which enables removal of the tire therefrom without removing the rim from a vehicle on which it is mounted.

The foregoing and other objects will be manifest as the specification proceeds, the invention being described with particular reference to the accompanying drawings, of which:

Figure 1:
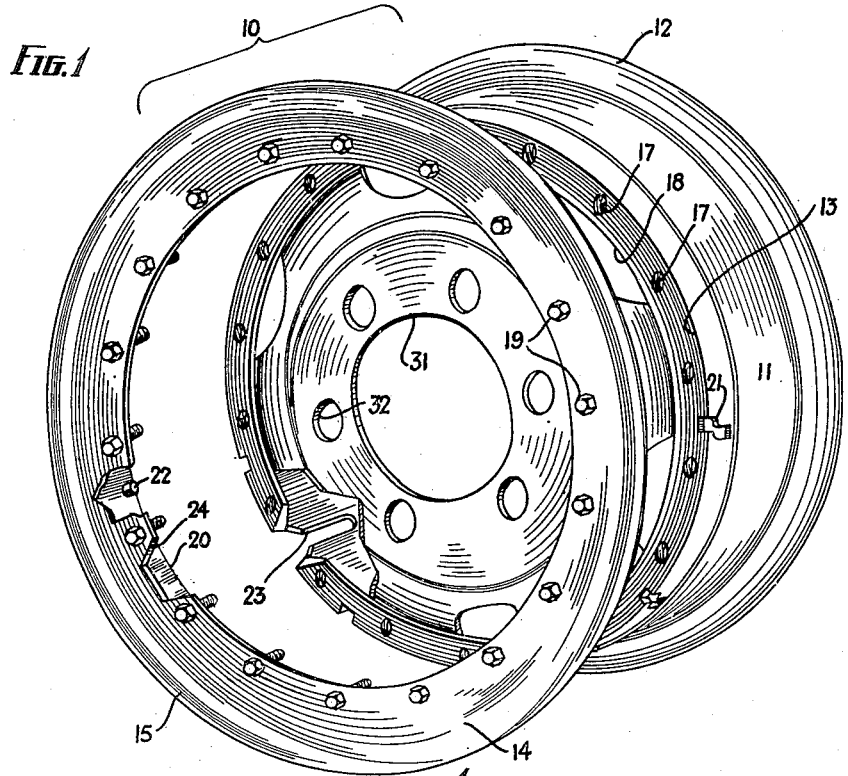
Figure 1 is a perspective view of the several elements of a wheel structure embodying the invention, portions of the wheel being broken away.
Figure 2:
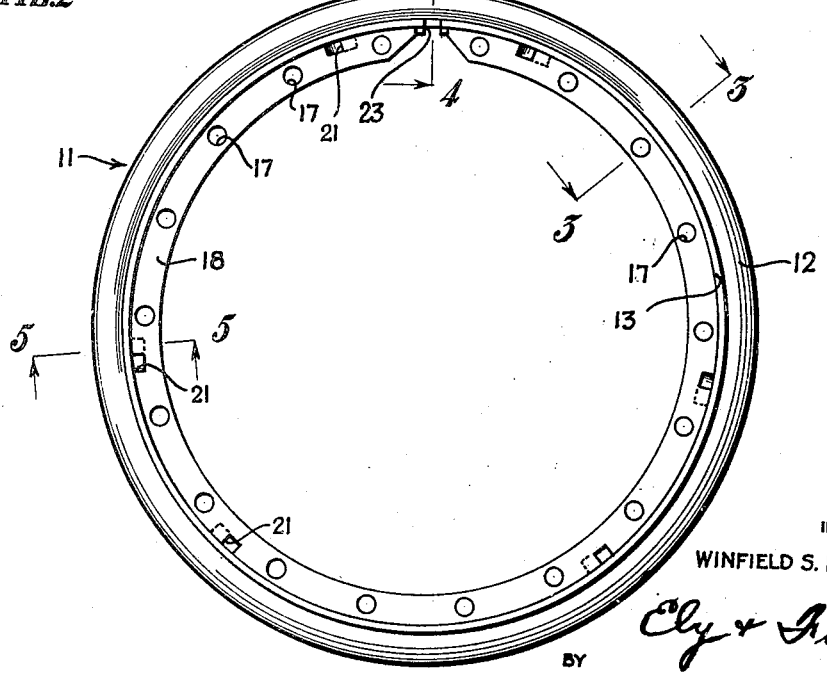
Figure 2 is an elevation of the rim base of Figure 1.

Figures 3, 4 and 5 are transverse cross sections taken on lines 3—3, 4—4 and 5—5 of Figure 2 with a rim side ring shown on the rim base; and Figure 6 is a plan of a locking slot used in the divided rim of Figure 1.

Referring specifically to the drawings, a divided rim 10 is shown therein which rim comprises a rim base 11, which has a continuous bead engaging flange 12 at one margin thereof and a portion 13 of reduced diameter at the other margin thereof, the main portion of the rim base being cylindrical. The rim 10 is completed by a rim side ring 14 which has a tire engaging flange 15 at the periphery thereof and a substantially cylindrical circumferential flange 20 extending axially of the ring on one side thereof. The flange 20 is constructed and arranged to be telescoped over the reduced diameter portion 13 of the rim base and fit snugly thereon. A circumferential series of spaced apertures 16 are provided in the rim side ring 14 and these apertures are aligned with similarly positioned threaded apertures 17 formed in a radially inwardly extending flange 18 formed on the edge of the reduced diameter portion 13 of the rim base. Bolts or screws 19 extend through apertures 16 and are threaded into the apertures 17 whereby the side ring is secured to the rim base in a removable manner.

The safety feature of the wheel or rim construction of the invention comprises a more or less bayonet type of joint formed between pins carried by the rim side ring and slots formed in the rim base. To this end substantially Z shaped slots 21 (Figure 6) are formed in the exposed edge of the rim base 11, which slots, as shown in Figure 1, are circumferentially spaced. Radially inwardly extending pins, or lugs 22 are welded to or otherwise secured to the inner surface of the cylindrical flange 20 of the rim side ring, which pins 22 are circumferentially spaced so that they will engage with the slots 21 when the rim side ring is disposed in proper position with respect to the rim base. When the rim members are properly aligned, the pins 22 are receivable in the slots 21 and enable the flange 20 to be telescoped part way over the reduced diameter portion of the rim base. After such initial telescoping action, the rim side ring must be rotated through a slight arc with respect to the rim base before further telescoping action is permitted by the pins 22 and slots 21.

It will be seen that the second phase of the lateral movement of the side ring toward the rim base is necessary because the arcuate movement of the side ring and rim base must occur when there is no appreciable pressure exerted on these members by a tire mounted thereon. Since the rims are particularly adapted to mount tires having means therein for forcing the tire beads laterally against the rim, the rim sections must be forcibly drawn together against the pressure of the bead lock means. Bolts 19 can be engaged with the apertures 17 as soon as they are aligned with the apertures 16 and be tightened to draw the rim sections together. Normally, however, the rim sections should have no force exerted thereon resisting movement of the sections toward each other, when the bolts are initially engaged therewith. Then in disassembling the construction, the tire (tube) is deflated, the bolts 19 removed, and the side ring rotated with relation to the rim base, after which the side ring and tire can be removed. If the bolts 19 inadvertently are removed before deflating the tire, the air in the tire merely will force the rim side ring laterally outwardly of its innermost position and the pins 22 will engage with the closed end 21ᵃ of the slot 21 thereby preventing blow off of the rim side ring. Only after the lateral outward pressure of the tire is removed, as by deflation, can the rim sections have relative movement so as to be disengaged. Figures 1 and 5 clearly show that the inner ends of the slots in the rim base are laterally offset from the outer ends thereof so that rotary movement of the rim base with relation to the side ring must occur in engaging the two members as well as disengaging same. The pins 22 are of the same width as the slots 21 and only slight clearance usually is provided therebetween. Obviously the apertures 16 and 17 are positioned so that they are aligned only when the pins 22 are at the innermost ends of the slots 21.

Figure 1 shows that a slot 23 is cut into the rim base 11 from the reduced diameter edge thereof. This slot is provided to receive the valve stem of a pneumatic tube carried on the wheel. A correspondingly positioned cut away region 24 is formed in the rim side ring to enable the valve stem to extend completely from the wheel and be readily accessible.

Another feature of the construction of the invention made possible by the provision of flange 20 on the rim side ring is that inwardly directed, tapered bead seats 25 and 26 can be formed on the rim base 11 and rim side ring 14 respectively. These bead seats enable the rim 10 to grip a tire mounted thereon at the beads thereof. In previous types of divided rim or wheel constructions the use of tapered bead seats has not been possible because the rim side ring was seated on the extreme edge of a rim base and the rim base carried both beads of the tire. Hence the use of tapered bead seats was impossible because the tire had to be telescoped over one bead seat of the rim base in order to position same thereon.

In view of the foregoing it should be realized that an inexpensive, sturdy, easily constructed, readily usable, foolproof divided safety rim or wheel has been provided by the invention and the objects thereof have been realized.

A disc 31 having bolt receiving holes 32 therein may be secured to the rim base 11 in order to mount the assembly on an axle of a vehicle. This manner of mounting the rim 10 is an added feature of the invention since the rim side ring 14 can be removed and a tire carried by the rim changed without removing the rim from the axle that mounts the same.

What is claimed is:

1. A circumferentially divided tire rim of the type described comprising a pair of telescopically engaged sections, one of said sections having a radially outwardly extending bead engaging flange and a rim base portion, said base portion having a radially inwardly tapered bead seat which merges into a substantially cylindrical central portion, said central portion in turn merging into a substantially cylindrical marginal portion of reduced diameter, said marginal portion having a plurality of off-set slots at intervals around the edge thereof, said slots being open at said edge and extending transversely of said section a first distance toward said flange, next a second distance in a generally circumferential direction of said section, next a third distance transversely of said section toward said flange, said section having a radially inwardly extending flange projecting from said marginal portion, said inwardly extending flange having threaded bolt holes formed at circumferentially spaced intervals therein, said section having a tire inner tube valve stem slot and means for mounting said section on an axle of a vehicle, the other of said sections being in the form of a side ring, said side ring having a radially outwardly extending bead engaging flange and a radially inwardly tapered bead seat formed on an axially extended flange portion, said flange portion having an inside diameter sufficient to permit it to telescope over the said reduced diameter portion of the first mentioned section, radially inwardly extending pins projecting from said axially extended flange, said slots being adapted to receive said pins and said pins being adapted to enter into and to slide in said slots during the assembly of said sections, said ring having bolt holes adapted to be aligned with the threaded bolt holes in said radially inwardly extending flange of the first mentioned section when said pins are in said third distance of said slots, bolts extending through said holes in the side ring and engaging the holes in threaded relation in said slotted section with said sections retained in assembled relation by said bolts only, said pins remaining in said third distance portion of said slots when said sections are in bolted relation, whereby said pair of sections may be drawn together and retained in bolted relation and said slots provide a safety holding means that becomes operative only in the event the bolts fail to hold.

2. A circumferentially divided tire rim of the type described which comprises a pair of sections each having bolt holes therein, said sections being adapted to be assembled in bolted telescopic relation, one of said sections having circumferentially spaced off-set slots formed therein and the other of said sections having pins depending therefrom, said slots being adapted to receive therein in sliding relation said pins, said slots extending transversely of said section a first distance toward a side flange of said tire rim, next a second distance extending in a generally circumferential direction of said section, and a third distance extending transversely of said section toward said flange, said bolt holes being in alignment when said pins are in the third distance of said slots, said slots being of such form and extent that when said sections are in said bolted relation the sides of said off-set slots do not contact said pins but in the event said bolts should fail when said rim is in service then said pins will contact the sides of said portion of said slots which extend generally circumferentially of said slotted section, and thereby retain said rim sections in assembled relation.

WINFIELD S. BRINK.